(12) United States Patent
Mueller et al.

(10) Patent No.: US 6,564,904 B2
(45) Date of Patent: May 20, 2003

(54) WALK-ON PLATFORM ARRANGEMENT

(75) Inventors: Guenther Mueller, Stuttgart (DE); Guenter Walter, Moeglingen (DE)

(73) Assignee: Duerr Systems GmbH, Stuttgart (DE)

( * ) Notice: Subject to any disclaimer, the term of this patent is extended or adjusted under 35 U.S.C. 154(b) by 87 days.

(21) Appl. No.: 09/833,028

(22) Filed: Apr. 11, 2001

(65) Prior Publication Data

US 2001/0050044 A1 Dec. 13, 2001

(30) Foreign Application Priority Data

Apr. 13, 2000 (DE) ..................... 200 06 862 U

(51) Int. Cl.[7] ................................. E04G 1/15
(52) U.S. Cl. ................ 182/222; 182/223; 52/7; 52/8
(58) Field of Search ................ 182/222, 223; 52/7, 8

(56) References Cited

U.S. PATENT DOCUMENTS

| | | | | |
|---|---|---|---|---|
| 5,632,357 A | * | 5/1997 | Matre | 187/200 |
| 6,217,484 B1 | * | 4/2001 | Harshman et al. | 434/255 |
| 6,341,683 B1 | * | 1/2002 | Hattori et al. | 198/324 |
| 6,354,041 B1 | * | 3/2002 | Guiles et al. | 52/9 |

FOREIGN PATENT DOCUMENTS

| | | |
|---|---|---|
| DE | 41 15 692 | 11/1992 |
| FR | 2 777 480 | 10/1999 |

* cited by examiner

Primary Examiner—Laura Edwards
(74) Attorney, Agent, or Firm—Barry R. Lipsitz

(57) ABSTRACT

In order to provide a walk-on platform arrangement, comprising at least one first sub-platform, which is movable from a rest position in a direction of extension into a working position, and a second sub-platform, which in the working position is disposed behind the first sub-platform, wherein a rear boundary edge of the first sub-platform and a front boundary edge of the second sub-platform in the rest position are spaced vertically apart from one another, with which platform arrangement the risk of accident for an operative walking on the platform arrangement in the working position is reduced, it is proposed that the platform arrangement comprises a guide system, by means of which the relative motion between the first sub-platform and the second sub-platform as the first sub-platform moves into the working position is guided in such a way that the vertical distance between the rear boundary edge of the first sub-platform and the front boundary edge of the second sub-platform in the working position is smaller than in the rest position.

13 Claims, 15 Drawing Sheets

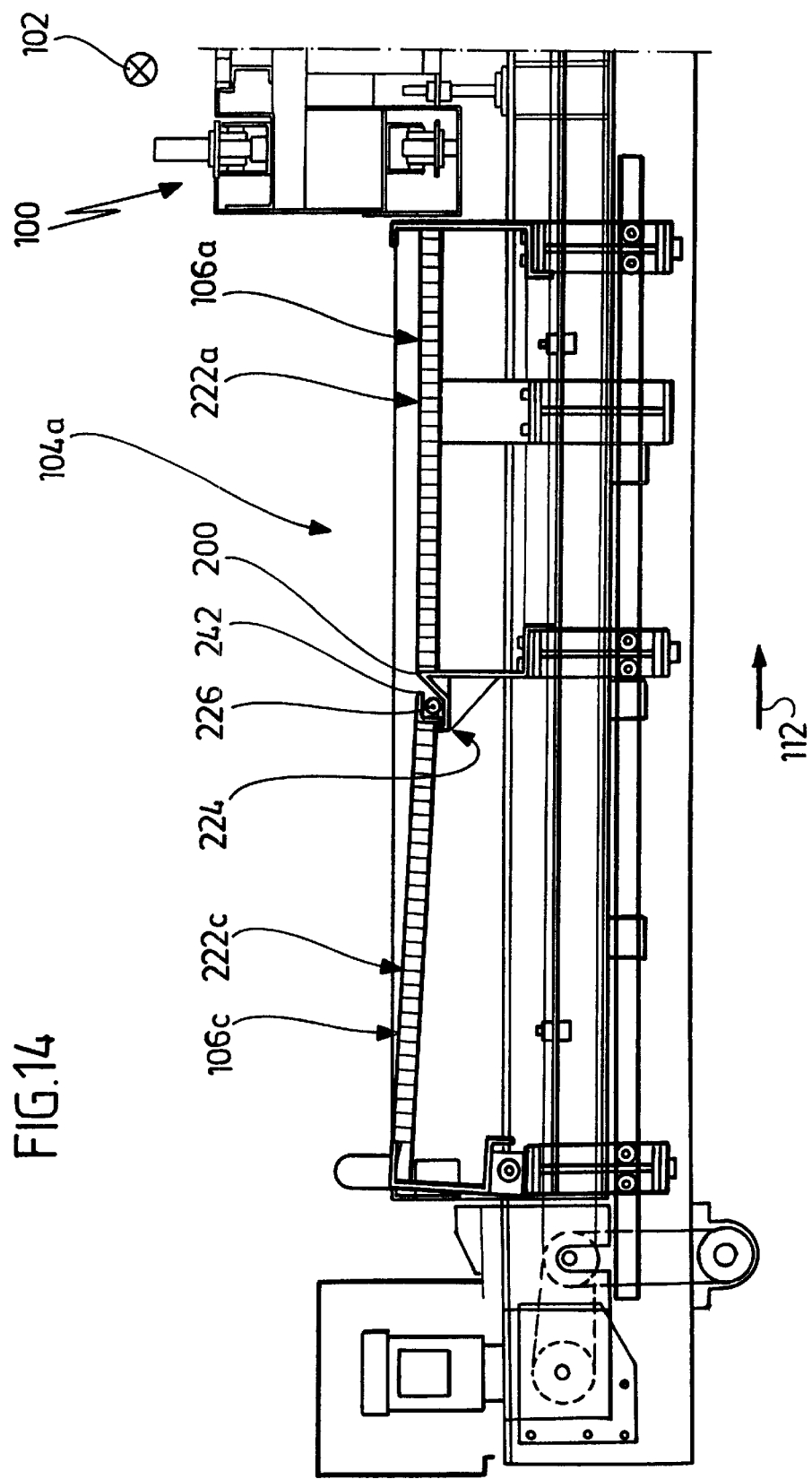

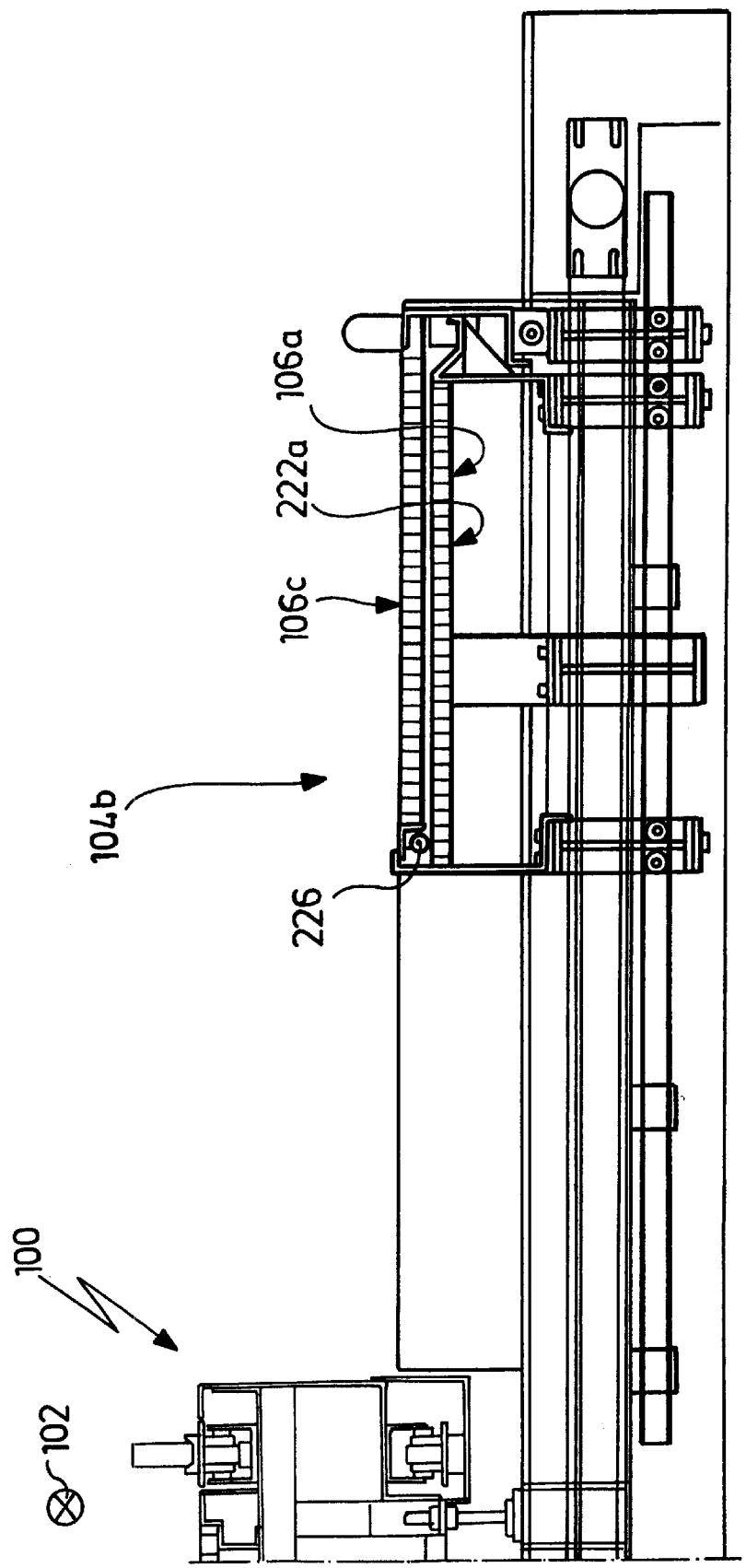

WALK-ON PLATFORM ARRANGEMENT

Figure 1:
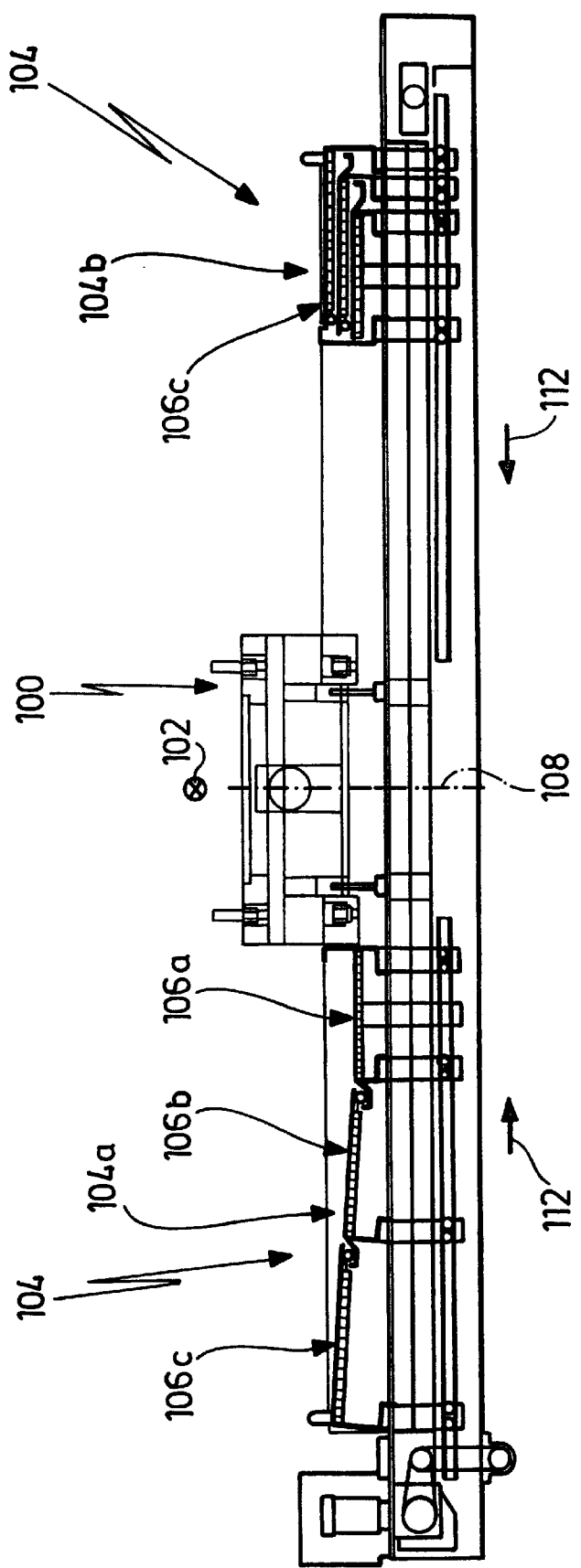

The present invention relates to a walk-on platform arrangement comprising at least a first sub-platform, which is movable from a rest position in a direction of extension into a working position, and a second sub-platform, which in the working position is disposed behind the first sub-platform, wherein a rear boundary edge of the first sub-platform and a front boundary edge of the second sub-platform in the rest position are spaced vertically apart from one another.

Such platform arrangements are known from prior art.

In particular, such platform arrangements are known, which comprise gratings and are used in automated zones of spray booths in vehicle body lacquering installations to provide a walk-on platform for maintenance purposes, whereas the sub-platforms of said known walk-on platform arrangements in the rest position are pushed together in such a way that the sub-platforms lie one above the other.

A drawback of the known walk-on platform arrangements is however that in the working position of the respective platform arrangement steps are formed between the sub-platforms and pose an accident risk because an operative walking on the platform arrangement for maintenance purposes may stumble over such a step and sustain a serious injury.

The object of the present invention is therefore to provide a walk-on platform arrangement of the type described above, which reduces the risk of accident for an operative walking on the platform arrangement in the working position.

In an example embodiment of a walk-on platform arrangement in accordance with the invention, at least a first sub-platform, which is movable from a rest position in a direction of extension into a working position, and a second sub-platform, which in the working position is disposed behind the first sub-platform are provided. A rear boundary edge of the first sub-platform and a front boundary edge of the second sub-platform in the rest position are spaced vertically apart from one another. A guide system is provided, by means of which the relative motion between the first sub-platform and the second sub-platform as the first sub-platform moves into the working position is guided in such a way that the vertical distance between the rear boundary edge of the first sub-platform and the front boundary edge of the second sub-platform in the working position is smaller than in the rest position.

In accordance with the concept according to the invention the height of the step, which arises between the two sub-platforms in the working position of the platform arrangement, is reduced compared to the known platform arrangements so that the risk of an operative stumbling or tripping over such a step while walking on the platform arrangement is markedly reduced.

Simply bevelling the front edge of the more elevated sub-platform would not have the desired effect because, particularly in spray booths of a vehicle body lacquering installation, the gratings of the platform arrangement are highly greased so that at bevelled points of the platform arrangement there would be a considerable danger of slipping, with the result that the accident risk would be increased rather than reduced.

It is particularly advantageous when the guide system is designed in such a way that the vertical distance between the rear boundary edge of the first sub-platform and the front boundary edge of the second sub-platform in the working position is smaller than the thickness of the second sub-platform. It is thereby guaranteed that the height of the step formed in the working position between the two sub-platforms is smaller than the thickness of the more elevated sub-platform, with the result that at such a step the foot of an operative may not pass below the more elevated second sub-platform and therefore get caught on the second sub-platform. This substantially reduces the accident risk compared to a platform arrangement, in which the step height is greater than the thickness of the more elevated sub-platform so that the foot of an operative may pass below the more elevated sub-platform.

In a preferred embodiment, it is provided that the guide system is designed in such a way that the vertical distance between the rear boundary edge of the first sub-platform and the front boundary edge of the second sub-platform in the working position is substantially zero. As a result, there is substantially no step at all formed between the two sub-platforms in the working position so that along the point of separation between the two sub-platforms there is no substantially greater risk of accident than at other points of the platform arrangement.

In principle, for realization of the platform arrangement according to the invention any relative motion between the two sub-platforms may be considered, which results in the vertical distance between the rear boundary edge of the first sub-platform and the front boundary edge of the second sub-platform in the working position being reduced compared to the rest position.

For example, it might therefore be provided that the guide system is designed in such a way that the rear boundary edge of the first sub-platform is raised as the first sub-platform moves into the working position.

In a preferred construction of the platform arrangement according to the invention it is however provided that the guide system is designed in such a way that the front boundary edge of the second sub-platform is lowered as the first sub-platform moves into the working position.

As yet no detailed information has been provided about the construction of the guide system.

It may therefore be provided that the guide system comprises at least one first guide element disposed on the one sub-platform, preferably at least two first guide elements disposed on the one sub-platform, and at least one second guide element disposed on the other sub-platform, preferably at least two second guide elements disposed on the other sub-platform.

In particular, it may be provided that the first guide element takes the form of a guideway, along which the second guide element is guided.

In a particularly simple construction of the platform arrangement according to the invention, the guideway comprises a substantially even rest portion and a deflection portion directed obliquely relative to the rest portion. By virtue of the deflection of the second guide element in the deflection portion of the guideway it is easily guaranteed that the two sub-platforms move in the desired manner relative to one another.

In the present case it has proved particularly successful when the deflection portion is inclined at an angle of approximately 20° to approximately 60°, preferably at an angle of approximately 40° to approximately 50°, relative to the even rest portion of the guideway.

To limit the maximum relative displacement of the two sub-platforms in the direction of extension, it may be provided that the guideway comprises a stop region for limiting the movement of the second guide element relative to the guideway.

It may further be provided that the first guide element comprises a receiving region for receiving the second guide element in the working position. The effect achieved thereby is that the position of the first guide element in the working position is well defined and the sub-platforms of the platform arrangement in the working position are not accidentally displaced relative to one another, which might endanger an operative walking on the platform arrangement.

In a preferred refinement of the platform arrangement according to the invention, it is provided that the second guide element comprises at least one roller. By virtue of the rolling of said roller along a first guide element in the form of a guideway, the two sub-platforms in the course of extension into the working position are guided relative to one another with very low friction.

The required relative motion in vertical direction between the rear boundary edge of the first sub-platform and the front boundary edge of the second sub-platform may be realized in a simple manner in that the first sub-platform and/or the second sub-platform is capable of swivelling about a substantially horizontal swivelling axis.

It is further advantageous when the sub-platforms comprise in each case a supporting frame for receiving at least one grating. Such, mostly rectangular gratings are obtainable as standard components, with the result that such a sub-platform comprising gratings is particularly easy and inexpensive to manufacture.

A sub-platform formed at least partially by gratings is moreover easy to clean.

In principle, the platform arrangement according to the invention may be formed by two sub-platforms, which in the working position are disposed one behind the other.

However, if the walk-on platform arrangement is to have as large a walk-on surface as possible in the working position and yet take up only a small amount of space in the rest position, it is advantageous when the platform arrangement comprises at least one third sub-platform, which in the working position is disposed behind the second sub-platform, wherein in the rest position a rear boundary edge of the second sub-platform and a front boundary edge of the third sub-platform are spaced vertically apart from one another and the platform arrangement comprises a guide system, by means of which the relative motion between the second sub-platform and the third sub-platform as the second sub-platform moves into the working position is guided in such a way that the vertical distance between the rear boundary edge of the second sub-platform and the front boundary edge of the third sub-platform in the working position is smaller than in the rest position.

In said manner the height of the step, which is formed in the working position between the second and third sub-platform, is reduced or even brought totally to zero in order to lessen the risk of accident. In said case, the same concept is applied as has already been described above for reducing the step height between the first sub-platform and the second sub-platform.

The concept according to the invention may be extended in a corresponding manner to include platform arrangements having any desired number of sub-platforms.

The walk-on platform arrangement according to the invention is particularly suitable for use in an installation for lacquering workpieces, in particular vehicle bodies, which comprises a conveying apparatus for conveying the workpieces through the installation and a walk-on platform arrangement, wherein the platform arrangement runs in longitudinal direction of the conveying apparatus and has a direction of extension aligned transversely, preferably at right angles to the longitudinal direction of the conveying apparatus. An operative may walk on said walk-on platform arrangement in the working position in order to service the conveying apparatus, while the sub-platforms of the walk-on platform arrangement in the rest position are spaced apart from the conveying apparatus in the direction of extension so that the sub-platforms in the rest position are situated outside the operative range of the lacquering installation, in which the workpieces are lacquered, and are therefore soiled with lacquer mist only slightly or not at all.

Further features and advantages of the invention are the subject matter of the following description and graphic representation of embodiments.

Figure 2:
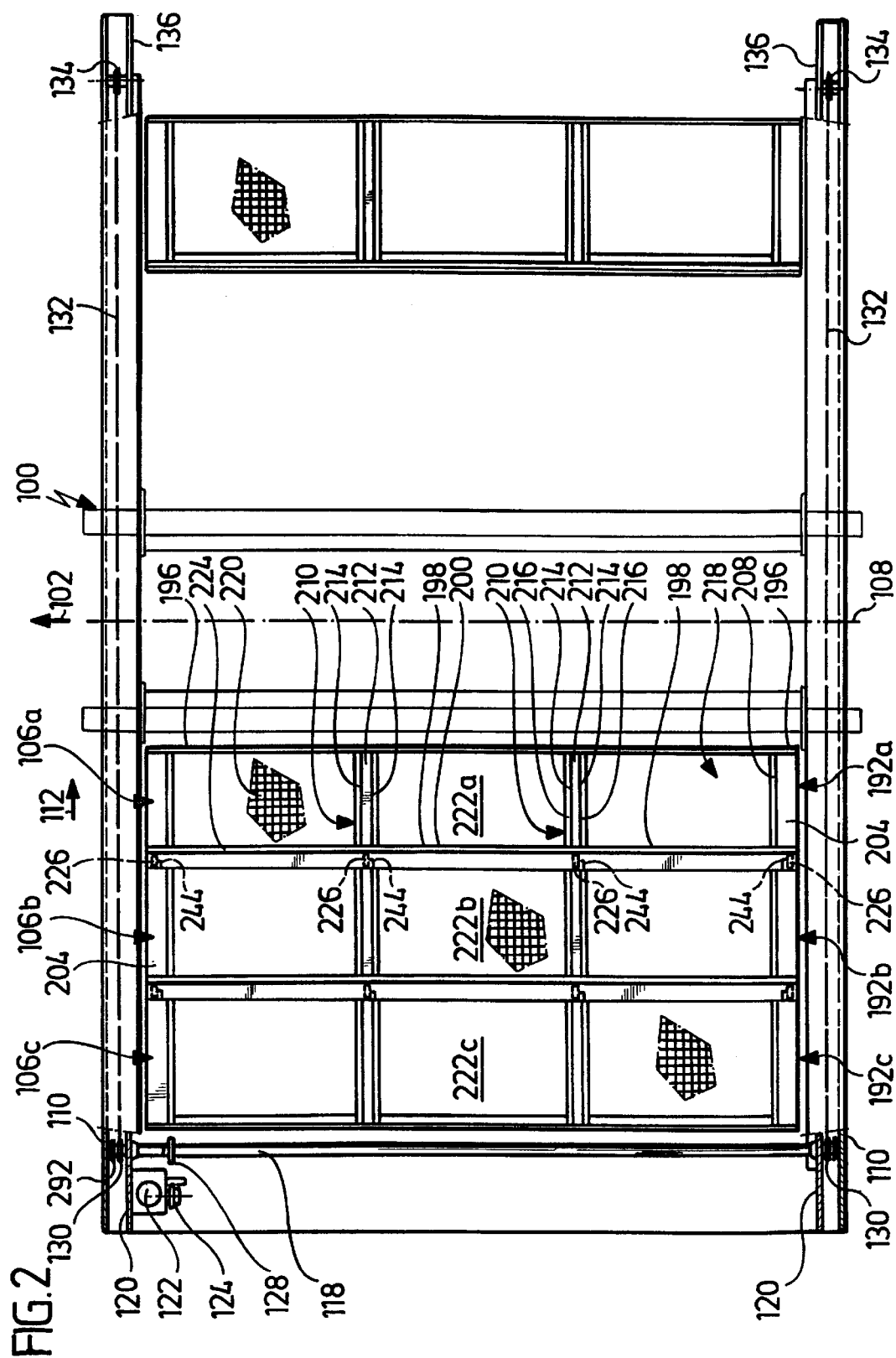
Figure 3:
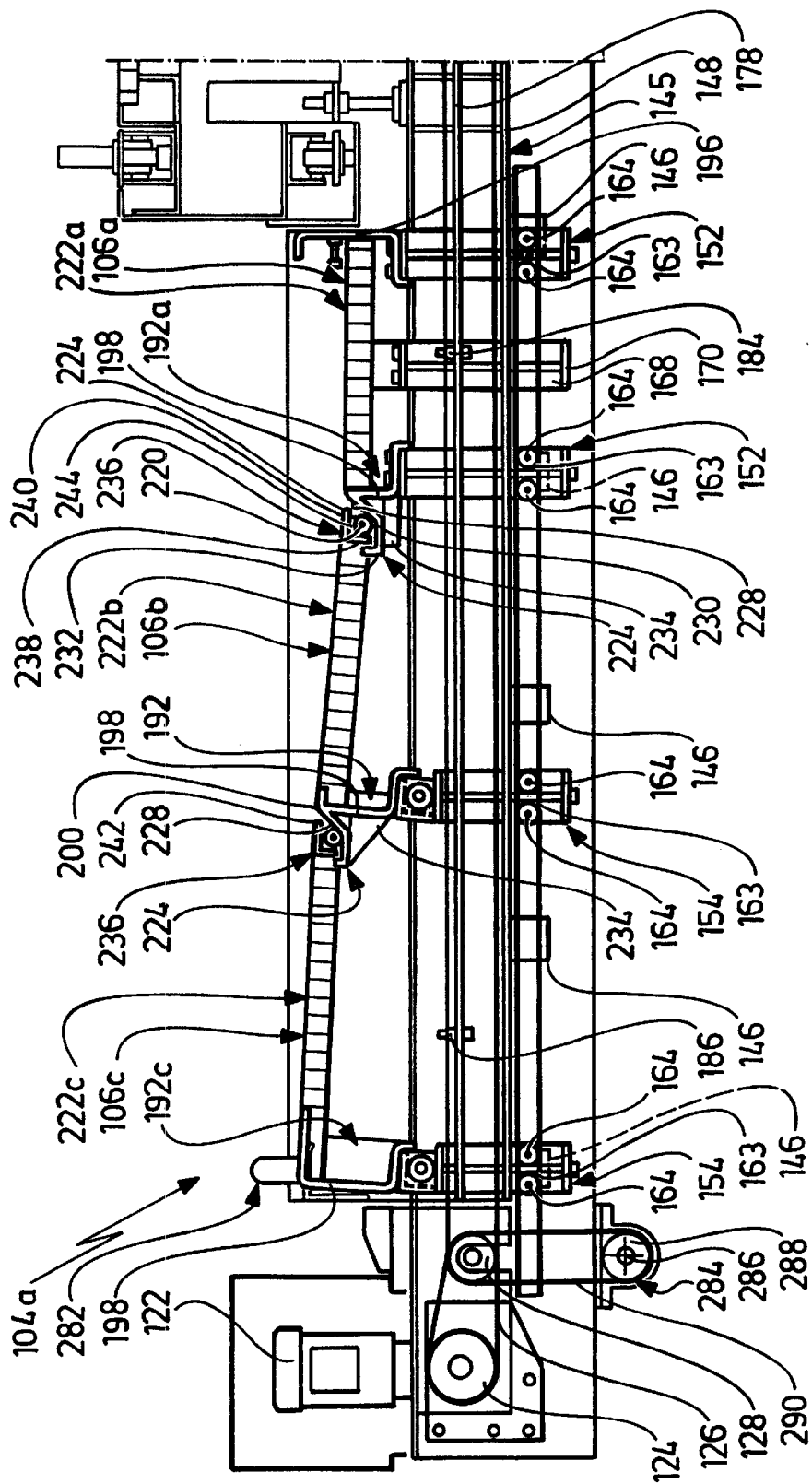
Figure 4:
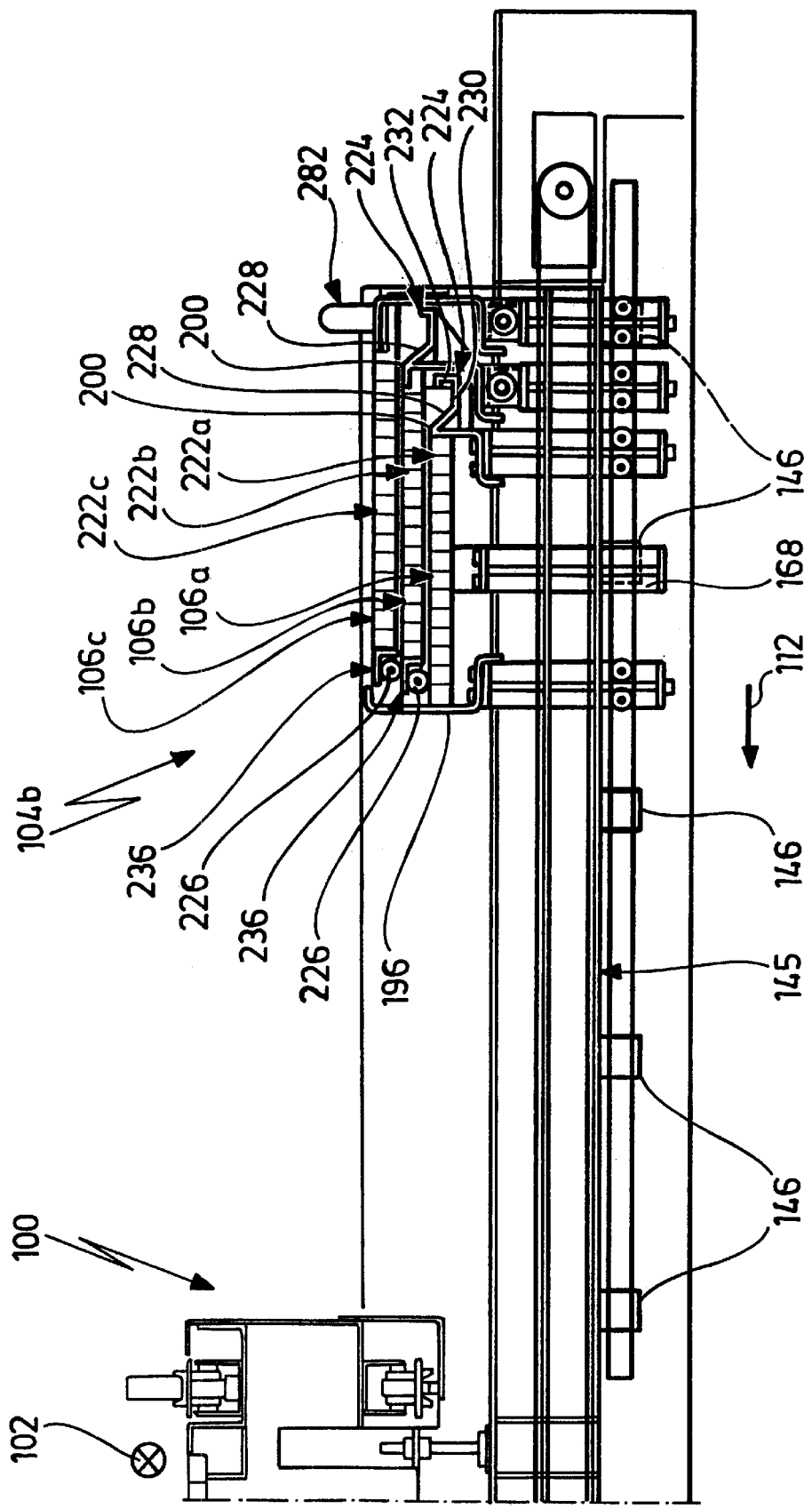
Figure 5:
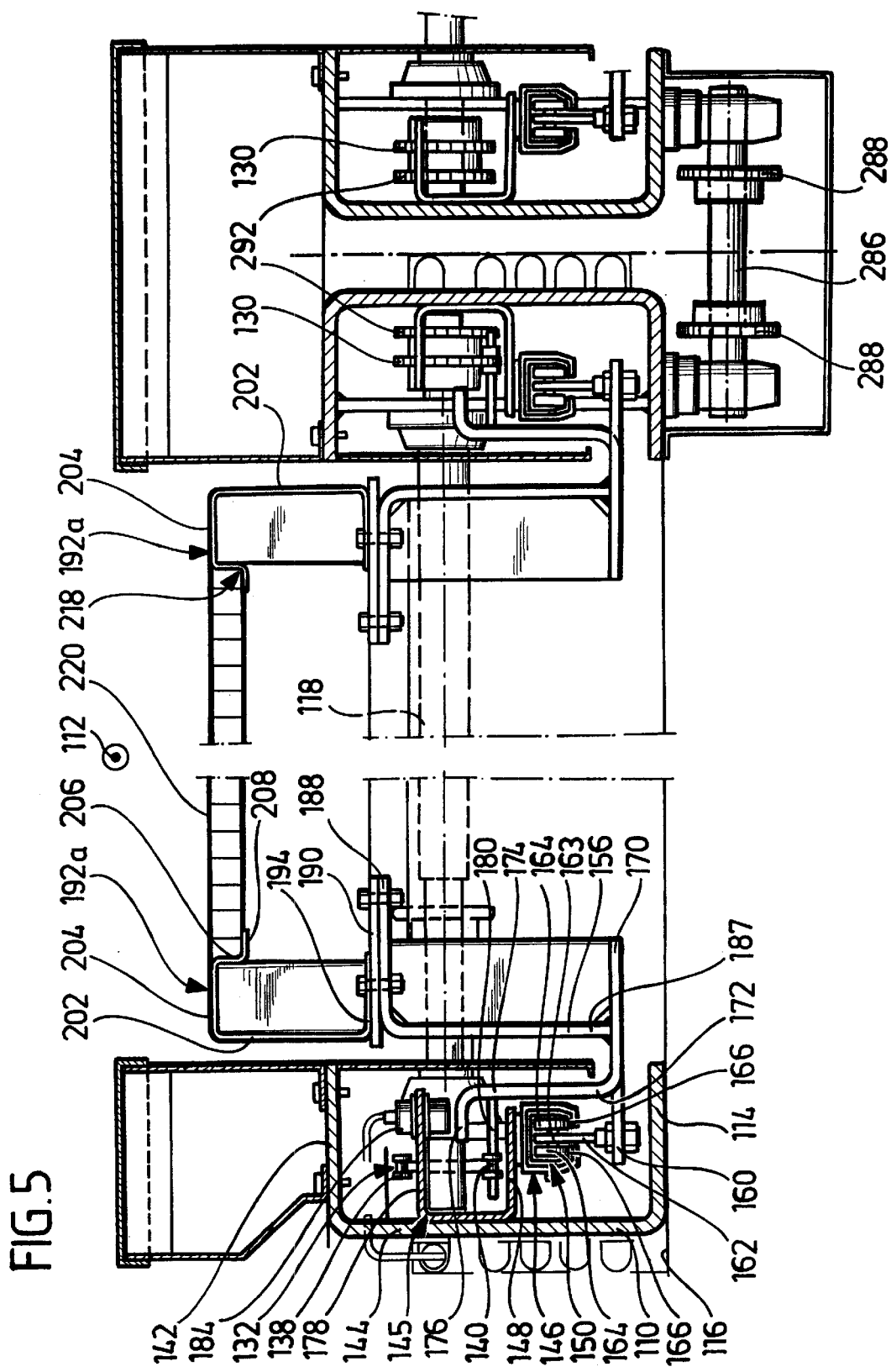
Figure 6:
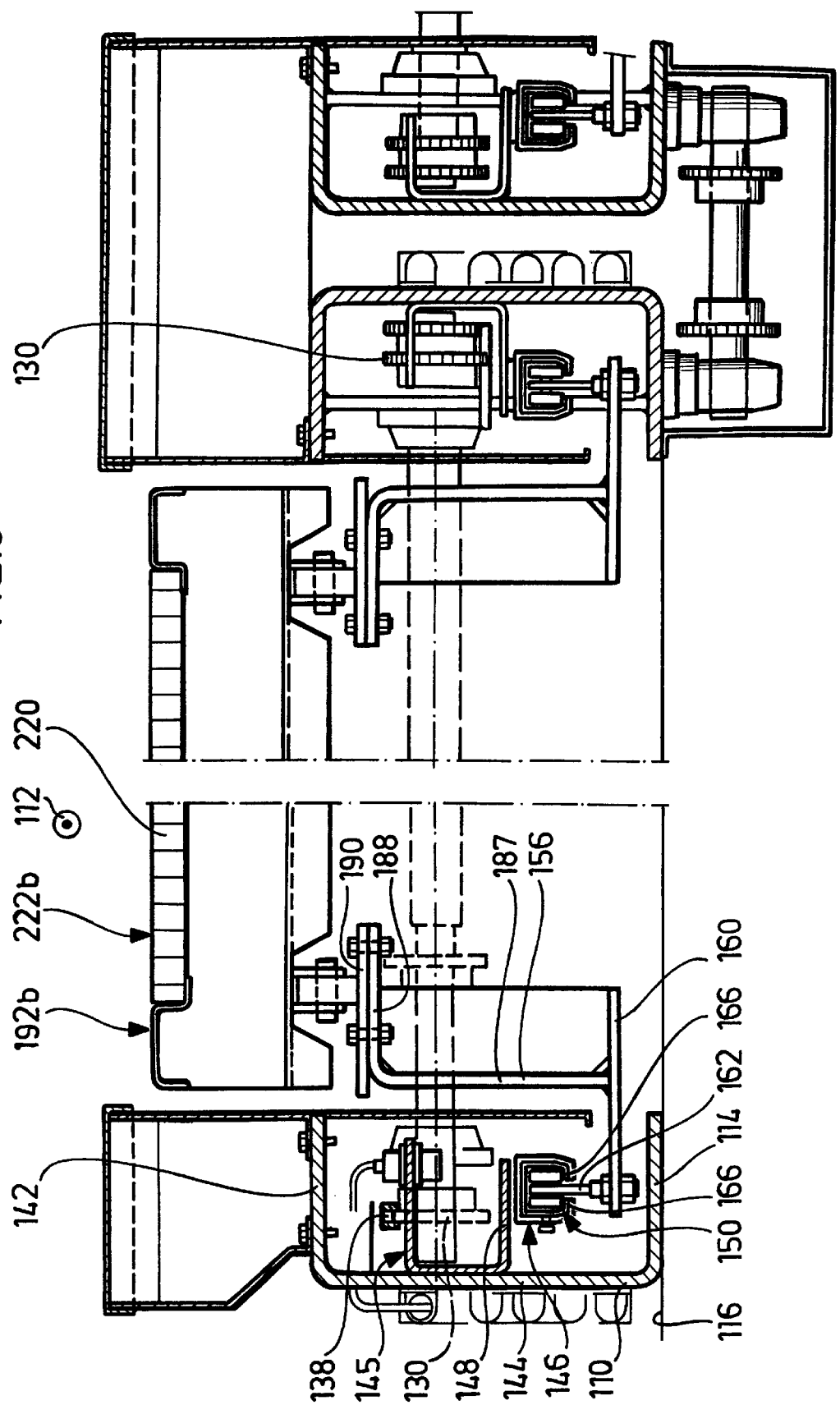
Figure 7:
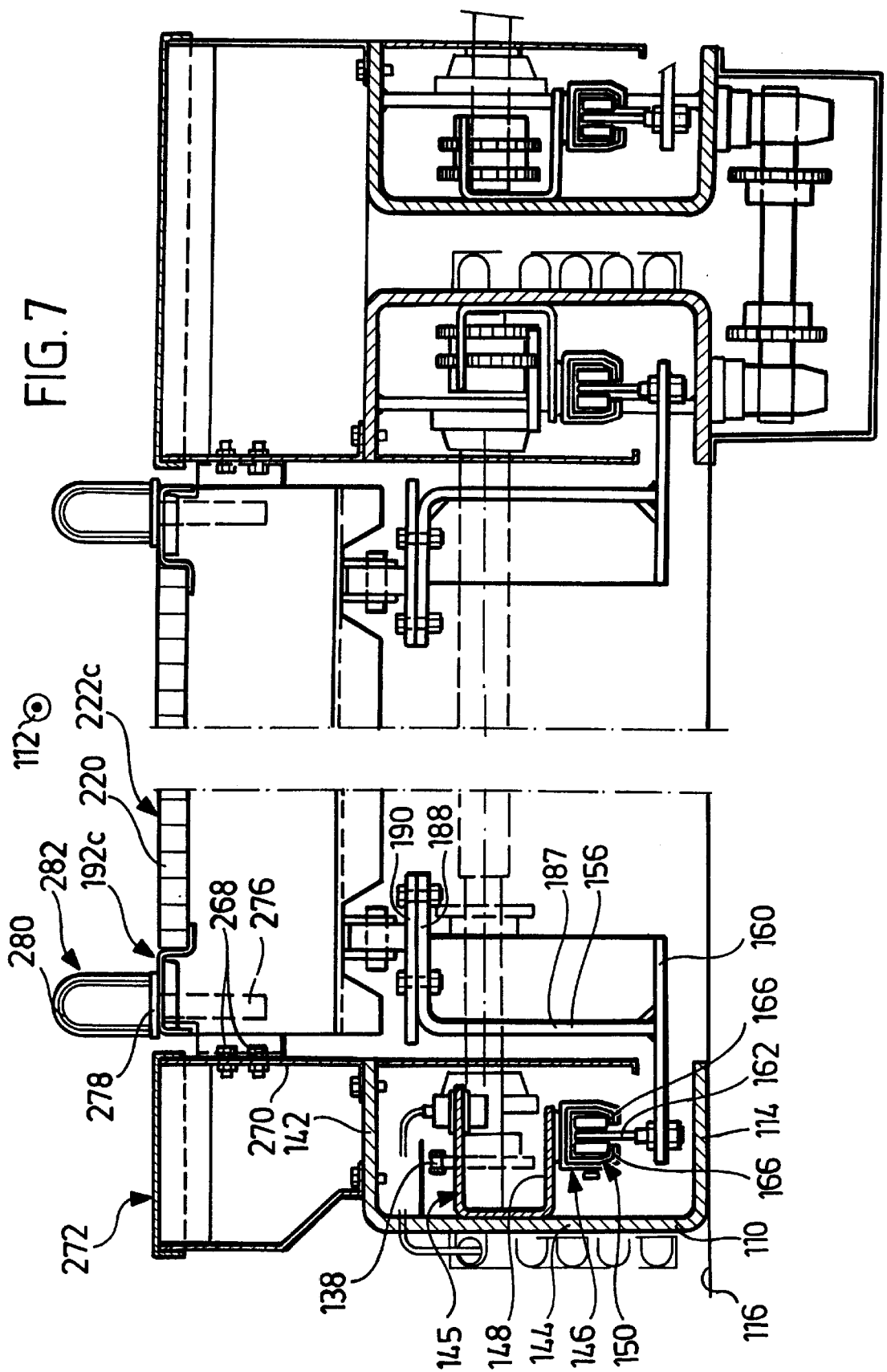
Figure 8:
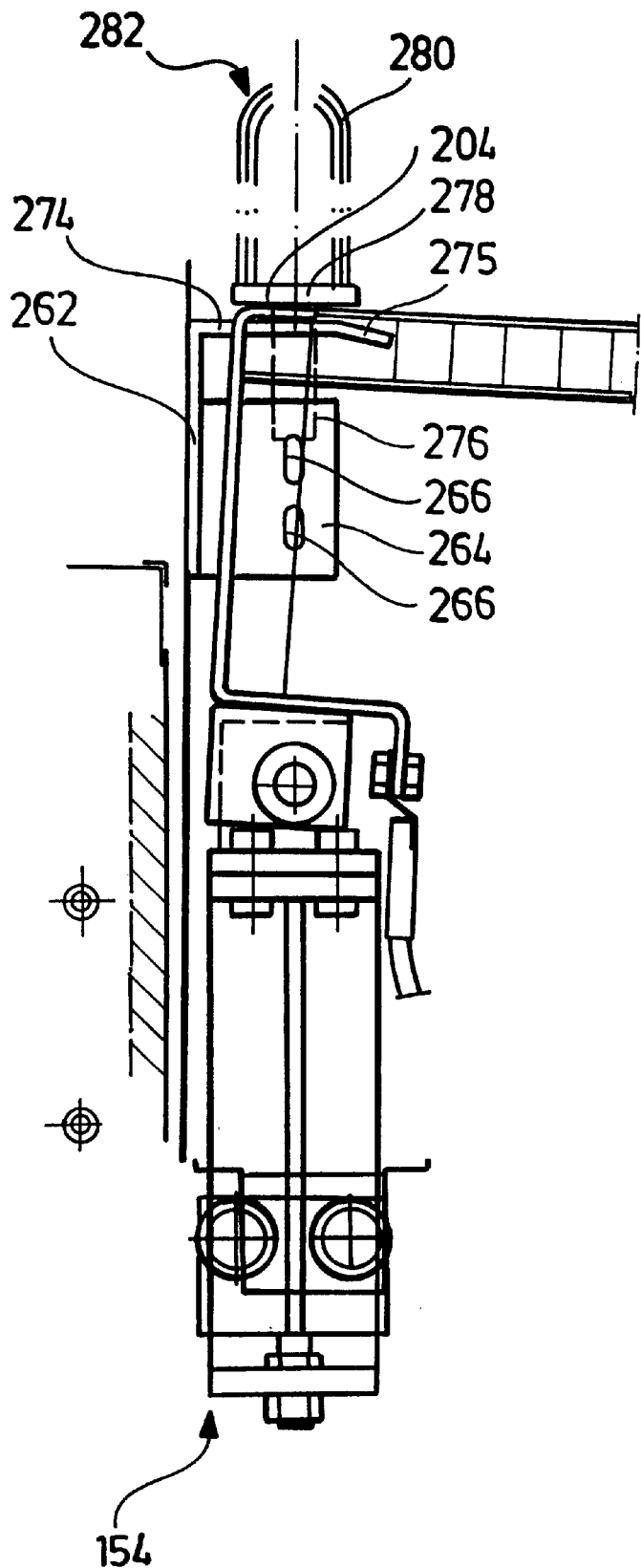
Figure 9:
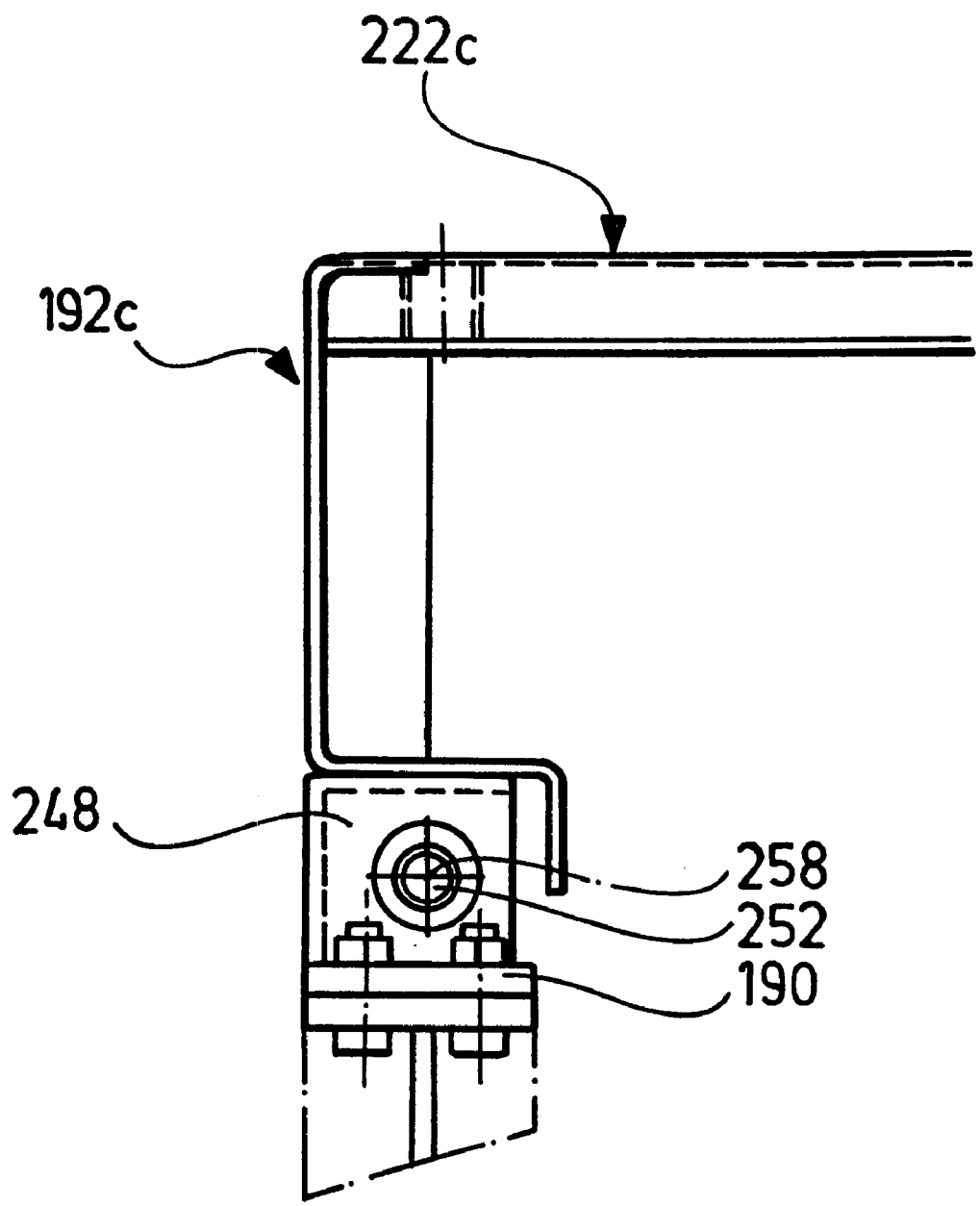
Figure 10:
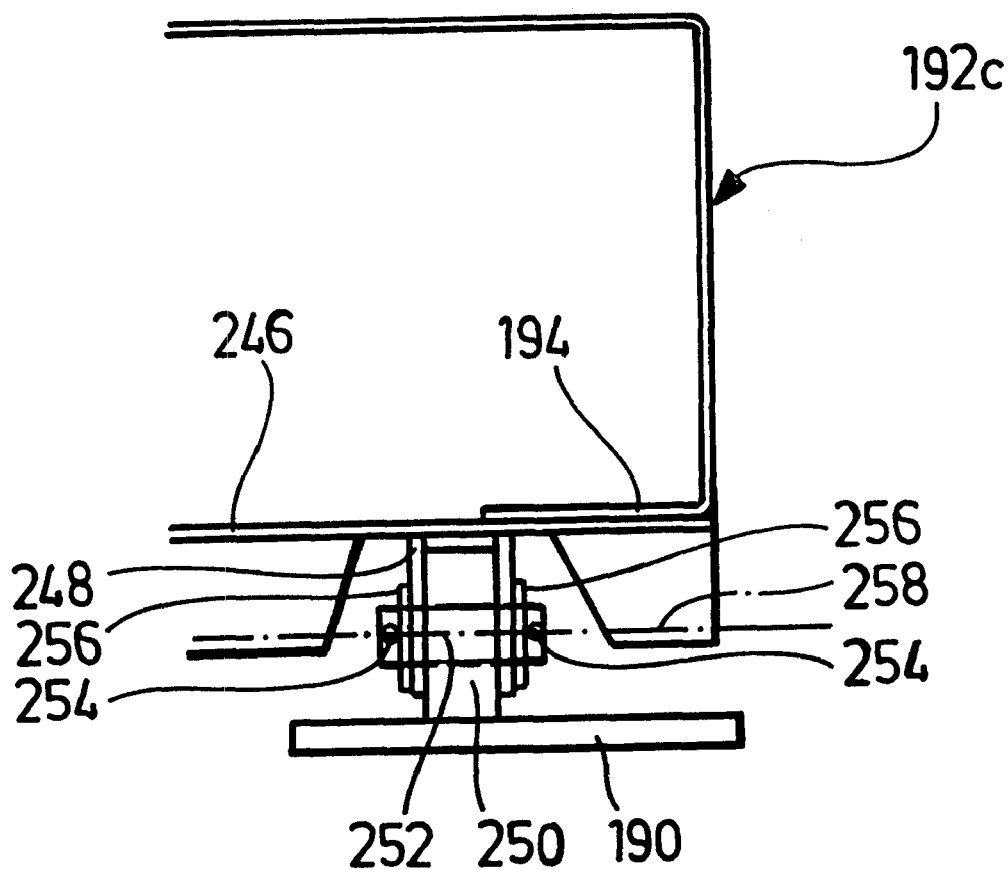
Figure 11:
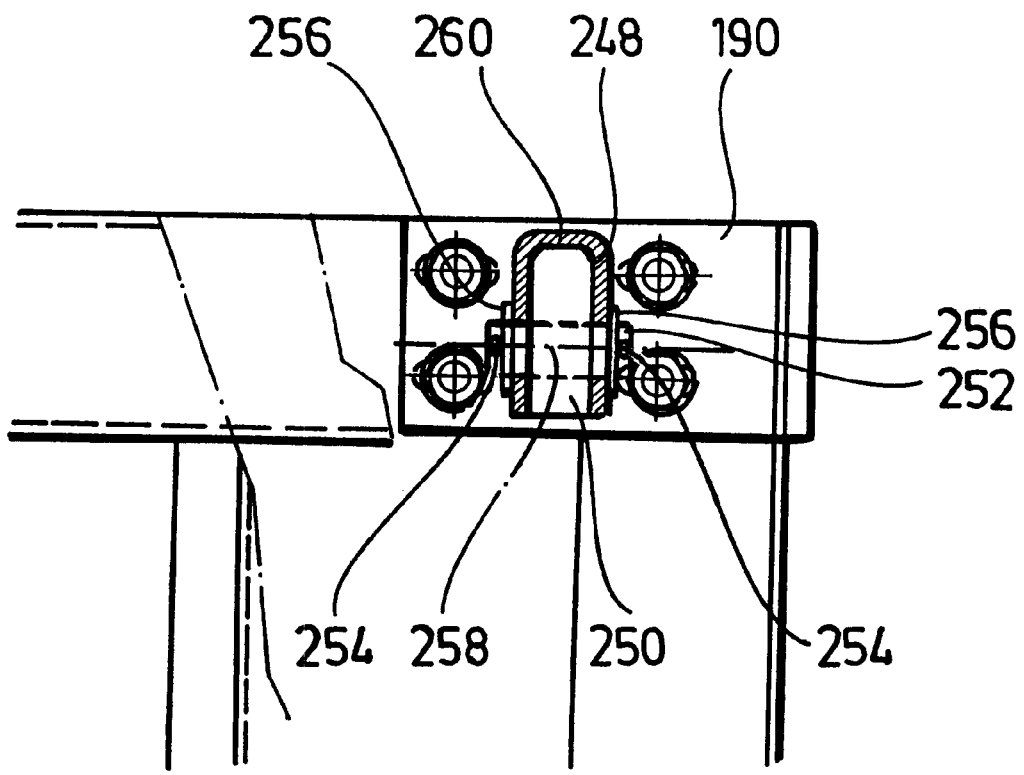
Figure 12:
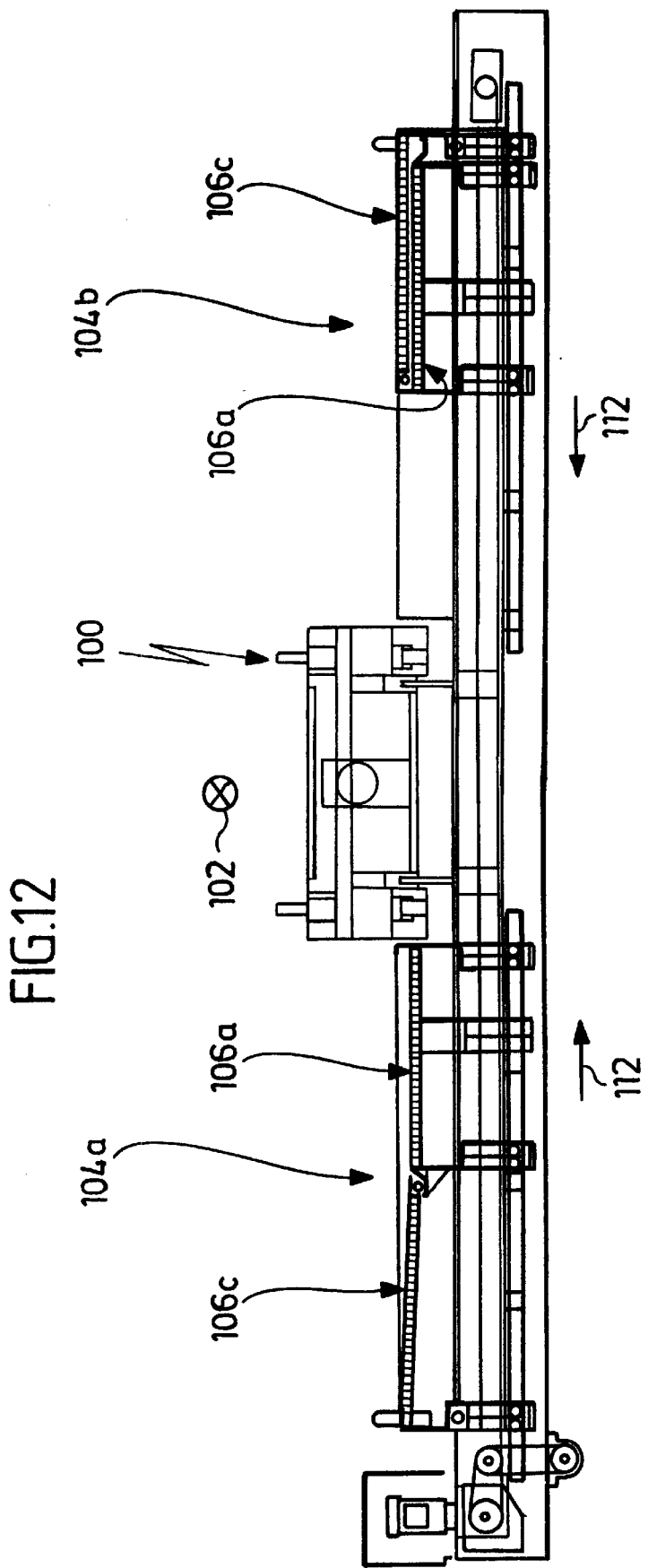
Figure 13:
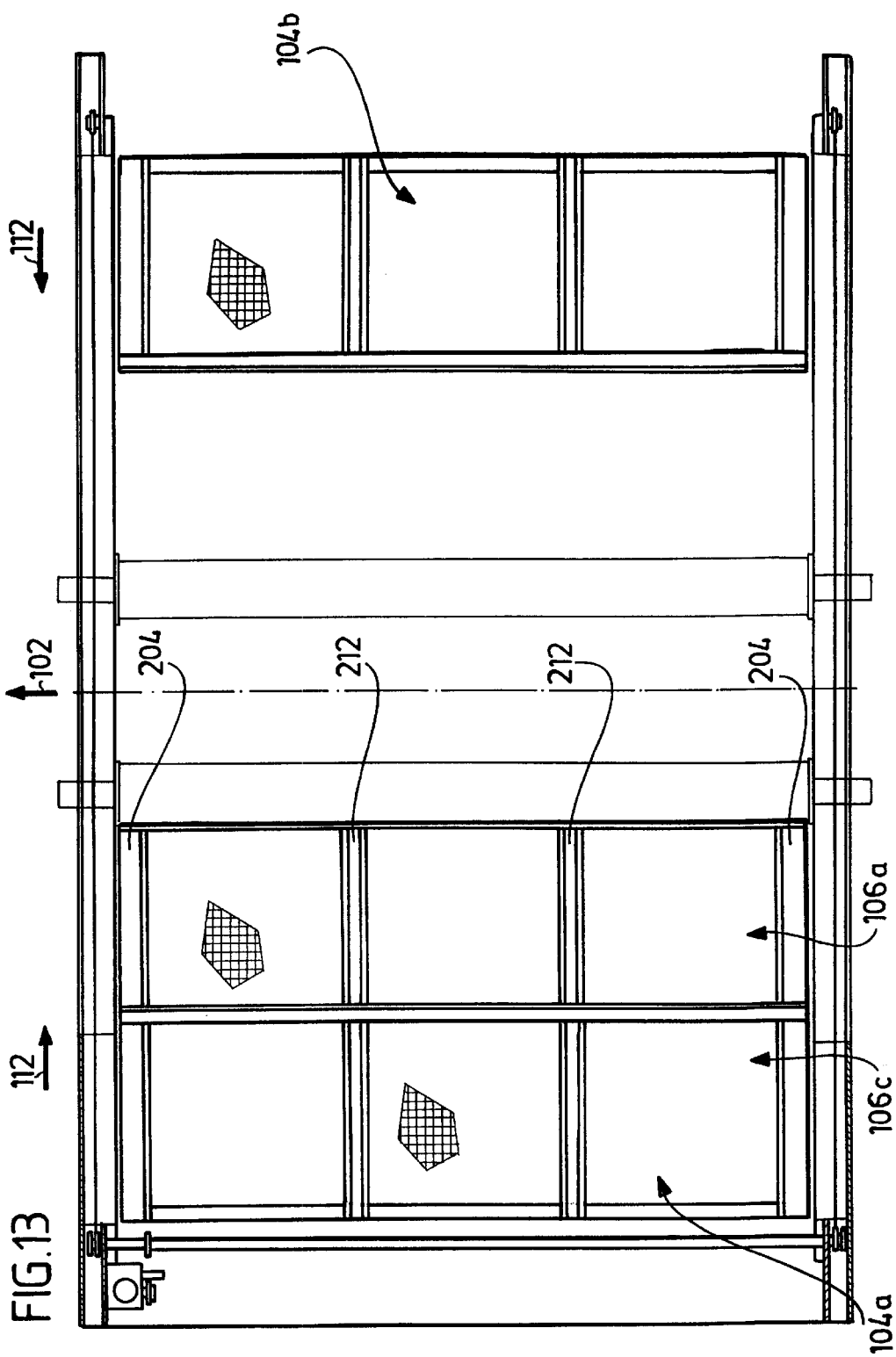

The drawings show:

FIG. 1 a cross section through a conveying apparatus and walk-on platform arrangements of a first embodiment disposed on either side of said conveying apparatus and comprising in each case three sub-platforms;

FIG. 2 a plan view of the conveying apparatus and the platform arrangements of FIG. 1;

FIG. 3 an enlarged detail from FIG. 1 showing the first embodiment of the platform arrangement in the working position;

FIG. 4 an enlarged detail from FIG. 1 showing the first embodiment of the platform arrangement in the rest position;

FIG. 5 a longitudinal section through the first embodiment of the platform arrangement in the working position in the region of an inner platform element;

FIG. 6 a longitudinal section through the first embodiment of the platform arrangement in the working position in the region of a middle platform element;

FIG. 7 a longitudinal section through the first embodiment of the platform arrangement in the working position in the region of an outer platform element;

FIG. 8 an enlarged detail from FIG. 3 showing a swivel mounting of a sub-platform of the first embodiment of the platform arrangement;

FIG. 9 a side view of the mounting of the sub-platform of FIG. 8 in the rest position;

FIG. 10 a view from the rear of the mounting of the sub-platform of FIG. 9;

FIG. 11 a part-sectional plan view of the mounting of the sub-platform of FIGS. 9 and 10;

FIG. 12 a cross section through a conveying apparatus and platform arrangements of a second embodiment disposed on either side of the conveying apparatus and comprising in each case two sub-platforms;

FIG. 13 a plan view of the conveying apparatus and the platform arrangements of FIG. 12;

FIG. 14 an enlarged detail from FIG. 12 showing the second embodiment of a platform arrangement in the working position;

FIG. 15 an enlarged detail from FIG. 12 showing the second embodiment of a platform arrangement in the rest position.

In all of the drawings identical or functionally equivalent elements are denoted by the same reference characters.

A conveying apparatus 100, which is illustrated in FIGS. 1 to 3 by thin lines, is used to convey vehicle bodies (not shown) through an automated zone of a spray booth (not shown), in which the vehicle bodies are lacquered by means of automatic lacquering machines.

To enable servicing of the conveying apparatus 100 and the automatic lacquering machines in the spray booth, there is disposed on either side of the conveying apparatus 100, which extends in a longitudinal direction 102, a platform arrangement 104 comprising in each case three platform elements 106.

The platform arrangement 104a, which is illustrated on the left next to the conveying apparatus 100 in FIG. 1, is situated precisely in the working position, in which the platform elements 106 are disposed side by side and jointly form a walk-on platform extending as far as the conveying apparatus 100.

The platform element, which in the working position is adjacent to the conveying apparatus 100, is referred to hereinafter as the inner platform element 106a. The platform element, which in the working position is furthest away from the conveying apparatus 100, is referred to hereinafter as the outer platform element 106c. The platform element disposed between the inner and outer platform element is referred to hereinafter as the middle platform element 106b.

The second platform arrangement 104b illustrated on the right of the conveying apparatus 100 in FIG. 1 is constructed and disposed, in relation to a longitudinal centre plane 108, symmetrically to the first platform arrangement 104a.

In FIG. 1 the second platform arrangement 104b is situated in the rest position, in which the three platform elements 106 are disposed, not side by side, but one above the other so that in said rest position the inner platform element 106a and the middle platform element 106b are shielded by the outer platform element 106c against soiling during operation of the automatic lacquering machines in the spray booth.

The view of FIG. 1 however serves merely as a comparison of the working and rest positions of the platform arrangements 104; in practice, the platform arrangements 104 are always either both in the working position or both in the rest position.

There now follows a detailed description of the construction of one of the platform arrangements 104.

As is evident in particular from FIGS. 2 and 5 to 7, the platform arrangement 104 at an, in the longitudinal direction 102, front end and at an, in the longitudinal direction 102, rear end is delimited in each case by a side piece 110, which both extend parallel to a horizontal direction of extension 112 aligned at right angles to the longitudinal direction 102 of the conveying apparatus 100 and have in each case a substantially U-shaped cross section, wherein the open sides of said U-shaped cross sections are directed towards one another (see FIGS. 5 to 7). The side pieces 110 are supported by their lower vertical limbs 114 on a flat base 116.

As may best be seen from the plan view of FIG. 2, a drive shaft 118 extends between the ends of the side pieces 110 remote from the conveying apparatus 100 and over virtually the entire length of the platform arrangement 104 and is rotatably mounted on two supporting walls 120, which are adjacent in each case to one of the side pieces 110.

The drive shaft 118 may be set in rotation by a drive motor 122 (see FIG. 3) via a chain wheel 124 disposed on the output shaft of the drive motor 122, a chain 126 and a chain wheel 128 disposed on the drive shaft 118.

Two driving chain wheels 130 disposed in each case on the ends of the drive shaft 118 carry in each case a driving chain 132, which is further conveyed in each case around a deflection chain wheel 134, which is rotatably mounted in a supporting wall 136.

The axes of the deflection chain wheels 134 and the driving chain wheels 130 lie at the same level so that the upper strand 138 (see FIG. 5) and the lower strand 140 of each driving chain 132 extend substantially horizontally.

As is evident from FIG. 5, the upper strand 138 and the lower strand 140 of each driving chain 132 extend between the lower horizontal limb 114 and the upper horizontal limb 142 of the respective side piece 110.

Fastened to the inside of the vertical web 144 of each side piece 110 there is in each case a retaining rail 145, which extends parallel to the direction of extension 112 and has a U-shaped cross section, which is open towards the inside of the side pieces 110.

Fastened to the underside of the lower horizontal limb 148 of each retaining rail 145 are retaining brackets 146, which have a substantially C-shaped, downwardly open cross section and are spaced apart from one another in the direction of extension 112.

The plurality of retaining brackets 146, e.g. five, fastened to the same retaining rail 145 together hold in each case one guide rail 150, which has a likewise substantially C-shaped, downwardly open cross section and extends in the direction of extension 112.

On each of the guide rails 150 in each case two rigid running carriages 152 of the inner platform element 106a and in each case one swivelling running carriage 154 of the middle platform element 106b and of the outer platform element 106c are guided so as to be displaceable in the direction of extension 112.

As may best be seen from FIGS. 5 to 7, each of the running carriages 152, 154 comprises a substantially horizontal guide plate 160, which extends laterally from the supporting bracket 156 to a point underneath the respective guide rail 150.

Extending from each guide plate 160 up into the interior of the respective guide rail 150 is a vertical guide bar 162, which at its top end carries a vertical retaining plate 163 (see FIG. 3), on which in each case two pairs of guide rollers 164 are rotatably mounted, which roll in each case along a lower horizontal guide limb 166 (see FIGS. 5 to 7) of the guide rail 150 and hence guide the respective running carriage 152, 154 along the guide rail 150 in the direction of extension 112.

While the swivelling running carriages 154 of the middle platform element 106b and of the outer platform element 106c as well as the rigid running carriages 152 of the inner platform element 106a are used to guide the platform elements 106 along the guide rails 150, a driver 168 disposed in the direction of extension 112 between the two rigid guiding running carriages 152 of the first platform element 106a is used to effect the coupling between the inner platform element 106a and the driving chain 132.

For said purpose, as may best be seen from FIG. 5, a lower horizontal limb 170 (see FIG. 3) of a substantially Z-shaped connection plate 172 is provided at the underside of the driver 168. The vertical web 174 adjoining the lower horizontal limb 170 of the connection plate 172 extends up beyond the height of the lower horizontal limb 148 of the retaining rail 145 and carries at its top edge the upper horizontal limb 176 of the connection plate 172, which extends between the lower horizontal limb 148 and the upper horizontal limb 178 of the retaining rail 145 into the interior of the latter.

Fastened, e.g. by welding, to the outside of the vertical web 174 of the connection plate 172 directed towards the retaining rail 145 is a connecting pin 180, which projects from the vertical web 174 horizontally towards the lower strand 140 of the driving chain 132 and is fastened to a pair of link plates of the driving chain 132.

Thus, by means of the connecting pin 180 and the connection plate 172 a rigid connection is established between the driving chain 132 and the driver 168 so that, when the lower strand 140 of the driving chain 132 moves in the direction of extension 112, the inner platform element 106a simultaneously moves in the same direction.

The upper strand 138 of the driving chain 132 extends, as may be seen from FIG. 5, between the upper horizontal limb 178 of the retaining rail 145, on the one hand, and the upper horizontal limb 142 of the side piece 110, on the other hand. A vertical cover plate 182 is disposed between the retaining rail 145 and the guide rail 150, on the one hand, and the running carriages 152, 154 and the driver 168, on the other hand.

As may best be seen from FIGS. 3 and 5 to 7, an inner proximity switch 184 and an outer proximity switch 186 are further disposed on the upper horizontal limb 178 of the retaining rail 145. The proximity switches 184, 186 respond to the presence of the upper horizontal limb 176 of the connection plate 172 of the driver 168 in the detection range of the respective proximity switch.

The inner proximity switch 184 is disposed in such a way on the retaining rail 145 that the upper horizontal limb 176 of the driver 168 passes into the detection range of said proximity switch when the platform arrangement 104a has reached its working position, in which the inner platform element 106a is fully extended. The inner proximity switch 184 then switches off the drive motor 122 as soon as the working position has been reached.

The outer proximity switch 186 is disposed in such a way on the retaining rail 145 that the upper horizontal limb 176 of the driver 168 passes into the detection range of said proximity switch when the platform arrangement 104a is in its rest position, in which the inner platform element 106a is fully retracted. On attainment of said rest position, the outer proximity switch switches off the drive motor 122.

An L-shaped supporting bracket 156 having a vertical limb 187 and an upper horizontal limb 188 extends upwards from the top of each guide plate 160 of one of the running carriages 152, 154 and from the top of the lower horizontal limb 170 of each driver 168.

Fastened by means of suitable fastening bolts and nuts to the top of the upper horizontal limb 188 of each lower supporting bracket 156 of the running carriages 152, 154 or of the driver 168 there is in each case a horizontal supporting plate 190.

The supporting plates 190 of the rigid running carriages 152 and of the drivers 168 of the inner platform element 106a jointly carry a substantially rectangular supporting frame 192a of the inner platform element 106a.

As is evident from FIGS. 2, 3 and 5, the supporting frame 192a comprises at its lower end horizontal supporting limbs 194, with which the supporting frame 192a rests on the running carriages 152, 154 and the drivers 168, a vertical front boundary wall 196 forming a protective cover between the conveying apparatus 100 and the platform arrangement 104a, a vertical rear boundary wall 198, the upper edge of which forms a rear boundary edge 200, as well as vertical side boundary walls 202 which extend parallel to the direction of extension 112 and connect the front boundary wall 196 and the rear boundary wall 198 to one another.

As may best be seen from FIG. 5, the side boundary walls 202 at their upper edges carry horizontal rolling regions 204, which project towards the interior of the supporting frame 192a.

Adjoining the inner edges of the horizontal rolling regions 204 are downward-extending vertical receiving edge regions 206, the lower edges of which are in turn adjoined by horizontal receiving bearing regions 208.

As FIG. 2 reveals, the front boundary wall 196 and the rear boundary wall 198 of the supporting frame 192a are further provided, by virtue of two transverse webs 210 extending parallel to the direction of extension, with an in each case hat-shaped profile comprising a middle horizontal rolling region 212 adjoined at the lateral edges by downwardly projecting vertical receiving edge regions 214, from the lower edges of which in turn in each case a horizontal receiving bearing region 216 laterally projects.

The mutually opposing receiving bearing regions 216 and receiving edge regions 214 of the transverse webs 210, together with the regions of the front boundary wall 196 and rear boundary wall 198 delimited by the transverse webs 210, form a receiver 218 for a rectangular grating 220, which has parallel to the longitudinal direction 102 an extension of approximately 1 m and parallel to the direction of extension 112 an extension of approximately 50 cm and rests with its underside on the receiving bearing regions 216.

In a corresponding manner the receiving bearing regions 208 and the receiving edge regions 206, together with the in each case opposite receiving bearing regions 216 and receiving edge regions 214 as well as the adjoining regions of the front boundary wall 196 and rear boundary wall 198, likewise form in each case rectangular receivers 218 for in each case one rectangular grating 220.

For maintenance and cleaning purposes, the gratings 220 are easily removable in an upward direction from the receivers 218.

The top surfaces of the gratings 220, together with the rolling regions 204 and 212, form a flat walk-on sub-platform 222a of the inner platform element 106a, the rear boundary of which is formed by the rear boundary edge 200.

As may best be seen from FIG. 3, there is moreover disposed at the rear boundary wall 196 of the supporting frame 192a a run-in trough 224, which in the working position of the platform arrangement 104a receives a plurality of, e.g. four, supporting rollers 226, which are disposed at the front of the middle platform element 106b.

The run-in trough 224 extends at right angles to the direction of extension 112 over the entire length of the sub-platform 222a and has a substantially constant cross section, which comprises a run-in region 228 extending downwards from the rear boundary edge 200 at an angle of approximately 45° relative to the top surface of the sub-platform 222a, a supporting region 230 which adjoins the lower edge of the run-in region 228 and the top surface of which is aligned substantially parallel to the top surface of the sub-platform 222a, and a stop region 232 which adjoins a rear edge of the supporting region 230 and extends upwards from a rear edge of the supporting region 230 substantially at right angles to the top surface of the sub-platform 222a. Disposed below the run-in trough 224 are support plates 234, which are spaced apart from one another in the longitudinal direction 102 and fastened on the one hand to the underside of the support region 230 and on the other hand to the back of the rear boundary wall 198 and hence serve to support the run-in trough 224.

The middle platform element 106b, like the inner platform element 106a, comprises a supporting frame 192b which is used to receive three gratings 220. The supporting frame 192b is however not rigidly connected at the front and rear to guiding running carriages, like the supporting frame 192a of the inner platform element 106a, but is held only at its rear pivotally on the two swivelling running carriages 154. Details of said swivelling mechanism are described below in connection with the outer platform element 106c.

The rear boundary wall 198 of the supporting frame 192b of the middle platform element 106b is designed to be higher than the rear boundary wall 198 of the supporting element 192a of the inner platform element 106a so as to allow the sub-platform 222a of the inner platform element 106a in the rest position of the platform arrangement 104a to be pushed under the sub-platform 222b of the middle platform element 106b (see FIG. 4).

The front boundary of the supporting frame 192b of the middle platform element 106b is formed by a right-angled angle section 236 (see FIG. 3), which extends in the longitudinal direction 102 over the entire length of the sub-platform 222b and comprises a vertical limb 238 as well as a horizontal limb 240, the top surface of which is disposed flush with the top surface of the gratings 220 and forms part of the walk-on sub-platform 222b.

The front edge of the horizontal limb 240 of the angle section 236 forms a front boundary edge 242 of the sub-platform 222b.

Fastened to the underside of the horizontal limb 240 and to the front of the vertical limb 238 of the angle profile 236 is a plurality of, e.g. four, bearing blocks 244, on each of which one of the supporting rollers 226 of the middle platform element 106b is rotatably mounted. The supporting rollers 226 are spaced apart from one another in the longitudinal direction 102 and disposed in such a way that, when the platform arrangement 104a is retracted into its rest position, they roll along the rolling regions 204, 212 of the sub-platform 222a of the inner platform element 106a.

Just as in the case of the sub-platform 222a, the run-in region 228 of a run-in trough 224 extends downwards from the rear boundary edge 200 of the sub-platform 222b. The run-in trough 224 is supported by means of support plates 234 against the rear boundary wall 198 of the supporting frame 192b of the middle platform element 106b and is used, in the working position of the platform arrangement 104a, to receive the supporting rollers 226 at the front of the sub-platform 222c of the outer platform element 106c.

The outer platform element 106c, like the middle platform element 106b, comprises a supporting frame 192c which is disposed pivotally on the swivelling running carriages 154.

The rear boundary wall 198 of the supporting frame 192c is designed to be higher than that of the supporting frame 192b of the middle platform element 106b so as to allow the sub-platform 222b in the rest position of the platform arrangement 104a to be pushed under the sub-platform 222c of the outer platform element 106c (see FIG. 4).

The sub-platform 222c, like the sub-platform 222b, is provided at the front with an angle section 236, the front edge of which forms the front boundary edge 242 of the sub-platform 222c.

The swivelling mechanism, by means of which the supporting frame 192c is held pivotally on in each case one of the swivelling running carriages 154, is described in detail. below with reference to FIGS. 9 to 11.

As may best be seen from FIG. 10, the underside of the horizontal supporting limb 194 of the supporting frame 192c is fastened to the top of a web 246, which extends in the longitudinal direction 102 over the entire width of the sub-platform 222c.

Fastened to the underside of the web 246 is a bracket 248 with a U-shaped cross section (see FIG. 11), which opens towards the front of the outer platform element 106c. The bracket 248 embraces a bearing block 250, which extends upwards from the top of a horizontal supporting plate 190.

A cylindrical hinge pin 252 penetrates a horizontal through-hole in the bearing block 250 and through-holes, aligned with the horizontal through-hole, in the two limbs of the bracket 248 and is prevented from falling out of said through-holes by arresting pins 254, which project radially from the hinge pin 252. The axial play of the hinge pin 252 is reduced by washers 256.

By means of the swivelling mechanism described above, the supporting frame 192c is capable of swivelling out of its horizontal rest position forwards (i.e. in the viewing direction of FIG. 9, clockwise) about the axis 258 of the hinge pin 252. Swivelling of the supporting frame 192c in the opposite direction, on the other hand, is not possible because the web 260 of the bracket 248 strikes against the back of the bearing block 250 and therefore prevents rearward swivelling of the supporting frame 192c.

The swivelling mechanism, by means of which the supporting frame 192b of the middle platform element 106b is held pivotally on the swivelling running carriages 154, is of exactly the same construction as the previously described swivelling mechanism.

In order during extension of the inner platform element 106a to prevent the outer platform element 106c from being simultaneously moved in the direction of extension 112, a retaining angle 262 is moreover provided (see FIG. 8), which is fastened via a retaining plate 264 and by means of fastening screws 268 (see FIG. 7), which penetrate oblong holes 266 in the retaining plate 264, to a side wall 270 of a construction denoted as a whole by 272, which is carried by the side piece 110 (see FIG. 5).

As may best be seen from FIG. 8, the retaining angle 262 comprises an upper horizontal bearing plate 274, the front 275 of which is bent downwards at an angle to enable swivelling of the sub-platform 222c.

Provided in the bearing plate 274 is a through-hole, which is approximately aligned with a through-hole in the horizontal rolling region 204 of the supporting frame 192c of the outer platform element 106c, so that a substantially cylindrical retaining pin 276 may be inserted vertically through the two through-holes in order to arrest the outer platform element 106c against the retaining angle 262.

The retaining pin 276 is fastened to the underside of a base plate 278, which on its top surface carries a handle 280 curved into the shape of a bow, both ends of which are fastened to the base plate 278.

The retaining pin 276, the base plate 278 and the handle 280 together form a connector 282, which may be used to arrest the outer platform element 106c against the retaining angle 262.

The connector 282 may however also be used to fix the three platform elements 106a, 106b and 106c relative to one another in order to draw said platform elements jointly as a stack towards the conveying apparatus 100 in order to clean the region of the spray booth, above which the platform elements are disposed in the rest position of the platform arrangement 104a.

For said purpose, the horizontal rolling regions 204 of the supporting frames 192a, 192b and 192c have in each case approximately central through-holes, which in the rest position of the platform arrangement 104a are substantially mutually aligned so that the connector 282 may be inserted, retaining pin 276 first, through the through-holes of all three platform elements, with the result that the platform elements are fixed relative to one another and, when the inner platform element 106a is extended, the middle platform element 106b and the outer platform element 106c are carried along by the inner platform element 106a.

As already mentioned, the platform arrangement 104b disposed at the other side of the conveying apparatus 100 is constructed and disposed, in relation to the longitudinal centre plane 108, substantially symmetrically to the platform arrangement 104a. The platform arrangement 104b however does not have an independent drive motor; rather, the drivers 168 of the inner platform element 106a of the platform arrangement 104*b* are simultaneously moved in synchronism with the drivers 168 of the platform arrangement 104*a* by the joint driving chain 132.

However, because the direction of extension of the platform arrangement 104*b* is in the opposite direction to the direction of extension of the platform arrangement 104*a*, the connecting pins 180 of the drivers 168 of the platform arrangement 104*b* are connected, not to the lower strand 140, but instead to the upper strand 138 of the driving chain 132. As the upper strand 138 and the lower strand 140 of the driving chain 132 always move in opposite directions to one another, it is therefore guaranteed that, when the inner platform element 106*a* of the platform arrangement 104*a* is extended into the working position, the inner platform element 106*a* of the platform arrangement 104*b* is also extended towards the conveying apparatus 100, and that, when the inner platform element 106*a* of the platform arrangement 104*a* is retracted into the rest position, the inner platform element 106*a* of the platform arrangement 104*b* is also moved into the rest position.

Since the platform arrangements 104*a* and 104*b* are always moved in synchronism, there is no need to provide proximity switches also on the retaining rails 145 of the second platform arrangement 104*b* because the drive motor 122 is controlled by means of the proximity switches 184, 186 of the first platform arrangement 104*a*.

In longitudinal direction 102 a further platform arrangement may adjoin the first platform arrangement 104*a* and a further platform arrangement may adjoin the second platform arrangement 104*b*.

By means of a transmission the common drive shaft of such additional platform arrangements may be driven likewise by the drive motor 122 of the platform arrangements 104*a*, 104*b*. Such a transmission denoted by 284 in FIG. 3 comprises a transmission shaft 286, which is disposed below the drive shaft 118 and carries a chain wheel 288, which by means of a transmission chain 290 is drivable by a transmission chain wheel 292, which is disposed on the drive shaft 118 adjacent to one of the driving chain wheels 130 (see FIG. 2).

The platform arrangements described above operate as follows.

During operation of the spray booth, in which the vehicle bodies conveyed through the spray booth by means of the conveying apparatus 100 are lacquered, the platform arrangements 104*a*, 104*b* are both situated in the rest position shown in FIG. 4, in which the sub-platforms 222*a*, 222*b* and 222*c* are disposed one above the other. In said case, the supporting rollers 226 of the middle platform elements 106*b* are supported on the rolling regions 204, 212 of the sub-platforms 222*a* of the inner platform elements 106*a*, so that the sub-platforms 222*b* of the middle platform elements 106*b* are aligned substantially horizontally.

In a corresponding manner the supporting rollers 226 of the outer platform elements 106*c* are supported on the rolling regions 204, 212 of the sub-platforms 222*b* of the middle platform elements 106*b*, so that the sub-platforms 222*c* of the outer platform elements 106*c* are aligned substantially horizontally.

The front boundary walls 196 of the supporting frames 192*a* of the inner platform elements 106*a* in said case fully overlap the fronts of the sub-platforms 222*a*, 222*b* and 222*c*, so that the supporting rollers 226 are shielded from the lacquer mist produced during lacquering of the vehicle bodies and hence do not become sticky but remain rotatable.

When the spray booth is to be serviced or cleaned, the drive motor 122 is started to set the driving chains 132 in rotation, and indeed in such a way that (viewed in the direction of FIGS. 3 and 4) the upper strand 138 of each driving chain 132 moves to the right and the lower strand 140 of each driving chain 132 moves to the left.

The drivers 168 are therefore moved in such a way that the inner platform elements 106*a* of both platform arrangements 104*a*, 104*b* are moved in the respective direction of extension 112 towards the conveying apparatus 100. During said extension motion of the inner platform elements 106*a* the supporting rollers 226 roll along the rolling regions 204, 212 of the sub-platforms 222*a* until they reach the rear boundary edges 200 of the sub-platforms 222*a*. The supporting rollers 226 then run down along the run-in regions 228 of the run-in troughs 224 at the rear end of the inner platform elements 106*a* until the supporting rollers 226 reach the support regions 230 and the angle sections 236 strike against the stop regions 232 of the run-in troughs 224. During said downward motion of the supporting rollers 226, the sub-platforms 222*b* of the middle platform elements 106*b* are swivelled in a downward direction about the swivelling axes 258 so that the sub-platforms 222*b* adopt the slightly inclined position shown in FIG. 3.

As soon as the angle profiles 236 of the middle platform elements 106*b* strike against the stop regions 232 of the run-in troughs 224 of the inner platform elements 106*a*, the middle platform elements 106*b* guided on the swivelling brackets 154 are moved simultaneously with the inner platform elements 106*a* in the direction of extension 112.

In said case, the supporting rollers 226 of the outer platform elements 106*c* roll along the rolling regions 204, 212 of the middle sub-platforms 222*b* until the supporting rollers 226 reach the rear boundary edges 200 of the sub-platforms 222*b*. The swivelling running carriages 154 of the outer platform elements 106*c* in said case do not move simultaneously in the direction of extension 112 because the outer platform elements 106*c* are arrested against the retaining angles 262 by means of the connector 282.

The supporting rollers of the outer platform elements 106*c*, after passing the rear boundary edge 200 of the sub-platform 222*b*, run down along the run-in regions 228 of the run-in troughs 224 of the middle platform elements 106*b*, wherein the sub-platforms 222*c* of the outer platform elements 106*c* swivel about their swivelling axes 258 in such a way that they adopt the inclined position shown in FIG. 3.

Before the angle sections 236 at the front of the sub-platforms 222*c* reach the stop regions 232 of the run-in troughs 224 of the middle platform elements 106*b*, the upper horizontal limbs 176 of the connection plates 172 on the drivers 168 of the inner platform elements 106*a* pass into the range of the inner proximity switches 184, at which point the drive motor 122 is immediately switched off.

The platform arrangements 104*a*, 104*b* are then situated in the working position shown in FIG. 3, in which the sub-platforms 222*a*, 222*b* and 222*c* are disposed side by side and form a complete walk-on platform. As may be seen from FIG. 3, the front boundary edges 242 of the sub-platforms 222*b* and 222*c* are situated substantially at the same height as the rear boundary edges 200 of the sub-platforms 222*a* and 222*b* respectively, so that the complete platform has no steps, over which a person walking on the complete platform might stumble and sustain an injury.

Furthermore, the horizontal distances between the front boundary edges 242 of the sub-platforms 222*b* and 222*c*, on the one hand, and the rear boundary edges 200 of the sub-platforms 222*a* and 222*b* respectively are also so small that between the sub-platforms there is only a narrow gap, which is too small for the shoes of a person walking on the complete platform to get caught in.

The inclination of the sub-platforms 222b and 222c is less than 10° relative to the horizontal and therefore so slight that the possibility of a person, who is walking on the complete platform, slipping on the inclined gratings 220 is substantially ruled out even when said gratings are highly greased and therefore slippery.

After maintenance and/or cleaning work in the spray booth has been completed, the platform arrangements 104a, 104b are moved back into the rest position by restarting the drive motor 122 in the opposite direction of rotation. The inner platform elements 106a are therefore moved away from the conveying apparatus 100 counter to the respective directions of extension 112. In said case, the supporting rollers 226 of the middle platform elements 106b run up along the run-in regions 228 of the run-in troughs 224 at the back of the inner platform elements 106a, with the result that the sub-platforms 222b are swivelled back into their horizontal starting position.

The supporting rollers 226 of the middle platform elements 106b then roll forward along the rolling regions 204, 212 of the sub-platforms 222a until the front boundary edges 242 of the sub-platforms 222b strike against the front boundary walls 196 of the inner platform elements 106a.

From said moment at the latest, the supporting rollers 226 of the outer platform elements 106c move relative to the middle platform elements 106b and run up along the run-in regions 228 of the run-in troughs 224 at the back of the middle platform elements 106b, with the result that the sub-platforms 222c of the outer platform elements 106c are swivelled back into their horizontal starting position. The supporting rollers 226 of the outer platform elements 106c then roll along the rolling regions 204, 212 of the sub-platforms 222b until the upper horizontal limbs 176 of the connection plates 172 on the drivers 168 of the inner platform elements 106a pass into the range of the outer proximity switches 186, at which point the drive motor 122 is immediately switched off.

The platform arrangements 104a, 104b are then situated once more in the rest position shown in FIG. 4, in which the vertical distances between the front boundary edges 242 of the sub-platforms 222b and 222c, on the one hand, and the rear boundary edges 200 of the sub-platforms 222a and 222b respectively are greater than the thickness of the sub-platforms 222b and 222c respectively.

When the area overlapped by the platform elements 106a, 106b, 106c in the rest position of the platform arrangements 104a, 104b is to be cleaned, the inner platform elements 106a are moved in the previously described manner towards the conveying apparatus 100 by means of the drive motor 122; before starting the drive motor 122, however, the connectors 282 are removed from the retaining angles 262 and introduced instead into the through-holes in the middle region of the rolling regions 204 of the sub-platforms 222a, 222b and 222c in order to eliminate a relative motion of the platform elements 106a, 106b and 106c. As a result, the platform elements are moved jointly towards the conveying apparatus 100, and the area overlapped by the platform arrangements 104a, 104b in the rest position is freely accessible for cleaning purposes.

The platform arrangements according to a second embodiment, which are illustrated in FIGS. 12 to 15, differ from the platform arrangements according to the first embodiment described above merely in that the platform arrangements of the second embodiment comprise in each case only two platform elements, namely an inner platform element 106a and an outer platform element 106c, and there is no middle platform element 106b.

Thus, in the working position shown in FIG. 14 the supporting rollers 226 of the outer platform elements 106c are accommodated in the run-in troughs 224 at the back of the inner platform elements 106a, wherein the front boundary edge 242 of the sub-platform 222c is situated substantially at the same height as the rear boundary edge 200 of the inner platform elements 106a.

In the rest position shown in FIG. 15, the supporting rollers 226 of the outer platform elements 106c are supported directly on the rolling regions 204, 212 of the sub-platforms 222a of the inner platform elements 106a.

Otherwise, the platform arrangements 104a, 104b are identical in construction and function to the platform arrangements 104a, 104b of the first embodiment and to said extent reference is made to the above description thereof.

The present disclosure relates to the subject matter disclosed in German utility model No. 200 06 862.8 of Apr. 13, 2000, the entire specification of which is incorporated herein by reference.

What is claimed is:

1. Walk-on platform arrangement, comprising:

at least a first sub-platform, which is movable from a rest position in a direction of extension into a working position, and a second sub-platform, which in the working position is disposed behind the first sub-platform, said first and second sub-platforms being arranged one above the other in said rest position and a rear boundary edge of the first sub-platform and a front boundary edge of the second sub-platform in the rest position being spaced vertically apart from one another by a vertical distance, a guide system, said guide system comprising at least one first guide element disposed on the one sub-platform and at least one second guide element disposed on the other sub-platform, said first and second guide elements cooperating directly with each other to guide relative motion between the first sub-platform and the second sub-platform as the first sub-platform moves into the working position in such a way that the vertical distance between the rear boundary edge of the first sub-platform and the front boundary edge of the second sub-platform in the working position is smaller than in the rest position.

2. Walk-on platform arrangement according to claim 1, wherein the guide system is designed in such a way that the vertical distance between the rear boundary edge of the first sub-platform and the front boundary edge of the second sub-platform in the working position is smaller than a thickness of the second sub-platform.

3. Walk-on platform arrangement according to claim 1, wherein the guide system is designed in such a way that the vertical distance between the rear boundary edge of the first sub-platform and the front boundary edge of the second sub-platform in the working position is substantially zero.

4. Walk-on platform arrangement according to claim 1, wherein the guide system is designed in such a way that the front boundary edge of the second sub-platform is lowered as the first sub-platform moves into the working position.

5. Walk-on platform arrangement according to claim 1, wherein the first guide element takes the form of a guideway, along which the second guide element is guided.

6. Walk-on platform arrangement according to claim 5, wherein the guideway comprises a substantially even rest portion and a deflection portion directed obliquely relative to the rest portion.

7. Walk-on platform arrangement according to claim 6, wherein the deflection portion is inclined at an angle of approximately 20° to approximately 60° relative to the even rest portion.

8. Walk-on platform arrangement according to claim 5, wherein the guideway comprises a stop region for limiting the movement of the second guide element relative to the guideway.

9. Walk-on platform arrangement according to claim 1, wherein the first guide element comprises a receiving region for receiving the second guide element in the working position.

10. Walk-on platform arrangement according to claim 1, wherein the second guide element comprises at least one roller.

11. Walk-on platform arrangement according to claim 1, wherein the first sub-platform and/or the second sub-platform is capable of swivelling about a substantially horizontal swivelling axis.

12. Walk-on platform arrangement according to claim 1, wherein the sub-platforms comprise in each case a supporting frame for receiving at least one grating.

13. Walk-on platform arrangement according to claim 1, wherein the platform arrangement comprises at least one third sub-platform, which in the working position is disposed behind the second sub-platform, wherein a rear boundary edge of the second sub-platform and a front boundary edge of the third sub-platform in the rest position are spaced vertically apart from one another and the platform arrangement comprises a guide system, by means of which the relative motion between the second sub-platform and the third sub-platform as the second sub-platform moves into the working position is guided in such a way that the vertical distance between the rear boundary edge of the second sub-platform and the front boundary edge of the third sub-platform in the working position is smaller than in the rest position.

* * * * *